United States Patent
Christiansen et al.

(10) Patent No.: US 6,450,064 B1
(45) Date of Patent: Sep. 17, 2002

(54) RESETTABLE SEPARATION MECHANISM WITH ANTI-FRICTION BEARINGS

(75) Inventors: Scott S. Christiansen; Scott F. Tibbitts; David E. Dowen, all of Longmont, CO (US)

(73) Assignee: Starsys Research Corporation, Boulder, CO (US)

( * ) Notice: Subject to any disclaimer, the term of this patent is extended or adjusted under 35 U.S.C. 154(b) by 0 days.

(21) Appl. No.: 09/574,494

(22) Filed: May 19, 2000

Related U.S. Application Data (60) Provisional application No. 60/135,137, filed on May 20, 1999.

(51) Int. Cl.[7] .............................. G05G 1/00; G05G 3/00; F16B 31/00; F16L 15/00
(52) U.S. Cl. ...................... 74/572; 411/14.5; 403/343; 74/2
(58) Field of Search ............................. 74/572–574, 2; 411/14.5, 6; 29/446; 403/343

(56) References Cited

U.S. PATENT DOCUMENTS

| | | | |
|---|---|---|---|
| 3,405,593 A | * 10/1968 | Kriesel | 85/33 |
| 5,123,794 A | * 6/1992 | Pire | 411/383 |
| 5,160,233 A | * 11/1992 | McKinnis | 411/433 |
| 5,221,171 A | * 6/1993 | Rudoy et al. | 411/433 |
| 5,248,233 A | * 9/1993 | Webster | 411/433 |
| 5,282,709 A | * 2/1994 | Chaput et al. | 411/433 |
| 5,312,152 A | 5/1994 | Woebkenberg, Jr. et al. | |
| 5,378,100 A | * 1/1995 | Fullerton | 411/267 |
| 5,381,879 A | * 1/1995 | Takata | 192/45 |
| 5,603,595 A | * 2/1997 | Nygren | 411/14.5 |
| 5,771,742 A | 6/1998 | Bokaie et al. | |

* cited by examiner

Primary Examiner—Vinh T. Luong
(74) Attorney, Agent, or Firm—Emery L. Tracy (57) ABSTRACT

A self-aligning release assembly for a separation mechanism is provided. The separation mechanism has a protective housing for selectively releasably securing a fastener. The protective housing is mountable to a structure. The release assembly comprises a rotatable flywheel having an internal bearing race with the bearing race having a plurality of recessed portions. A plurality of bearing elements contact the bearing race and a positioning element is positioned within and adjacent the flywheel for aligning and retaining the bearing elements. A retaining mechanism releasably retains the fastener with the retaining means positioned within the flywheel with the outer surfaces of the retaining means abutting the bearing elements.

10 Claims, 10 Drawing Sheets

RESETTABLE SEPARATION MECHANISM WITH ANTI-FRICTION BEARINGS

The present application is a continuation of abandoned provisional patent application Serial No. 60/135,137, filed on May 20, 1999, entitled "Resettable Separation Mechanism With Anti-Friction Bearings".

BACKGROUND OF THE INVENTION

1. Field of the Invention

This invention relates generally to separation mechanisms and, in particular, it relates to separation mechanisms adapted for retaining and remotely releasing bolts or other retained elements from engagement with various structures, such as spacecraft, to deploy objects, instrumentation, and equipment from the structures.

2. Description of the Prior Art

Spacecraft are useful for deploying payloads of equipment from a storage bay upon reaching a certain extraterrestrial location or orbit. The equipment that is deployed may include antennae, instrumentation, solar arrays, and communication systems that are often highly sensitive in nature and that must, therefore, be adequately restrained and protected during launch of the spacecraft and that must be deployed with minimal vibration, shock, or contamination to avoid damaging the equipment. Due to factors such as launch and repair costs and weight and power constraints, the space industry further demands that the device utilized for retaining and remotely releasing the equipment (i.e., the separation mechanism) comply with other design criteria including single fault tolerance, redundancy for critical features, minimal weight, wear and corrosion resistance, and efficient power consumption. It is also generally desirable that the separation mechanism that is installed in the spacecraft be testable to provide assurance that the mechanism will function as intended and be resettable after such testing or after use, i.e., be reusable.

A number of separation mechanisms have been employed to provide these retention and remote release functions while attempting to meet the space industry's other stringent design criteria. For example, pyrotechnic separation mechanisms, such as pin pullers, separation nuts, and cable cutters, have been used in spacecraft to release payloads. However, the use of pyrotechnic separation mechanisms is generally undesirable in spacecraft because of the large vibration and shock forces developed when the mechanism is fired or exploded, the potential of chemical contamination if a seal fails, the susceptibility of pyrotechnic devices to inadvertent ignition caused by electrostatic build-up or stray electric signals, and the inability to test, reset, or reuse such devices. Other separation mechanisms have employed burn-wire devices that generally operate by restraining a tensile force, e.g., a spring, with a filament or initiator that is ignited or melted to release or separate a retained element. As with the pyrotechnic separation devices, burn-wire devices can only be used once and cannot be effectively tested and then reset. More recently, separation mechanisms have employed shape memory alloys, generally as actuators, in an attempt to meet the needs of the space industry. See, for example, U.S. Pat. No. 5,771,742 to Bokaie et al. and U.S. Pat. No. 5,312,152 to Woebkenberg, Jr. et al. However, these mechanisms often require significant amounts of power and/or inefficiently use power and are relatively heavy.

Despite the ongoing efforts to meet the requirements of the space industry, there remains a demand for an improved separation mechanism that effectively satisfies the deployment needs of the space and other industries while overcoming the foregoing and other shortcomings of the prior art separation mechanisms.

SUMMARY

Accordingly, it is a general object of the present invention to provide an improved separation mechanism for securely retaining and controllably releasing a fastener or other object.

It is a more specific object of the present invention to provide an improved separation mechanism that releases a fastener or other object with reduced vibration and shock forces and with minimal or no risk of chemical or other contamination of nearby equipment.

It is related specific object of the present invention to provide a separation mechanism that efficiently uses power, is compact and lightweight, is testable, and is resettable, i.e., is useful for repetitive operations.

It is another general object of the present invention to provide an improved separation mechanism that provides redundancy of critical features, is single-fault tolerant, and meets other specific design criteria, such as corrosion and wear resistance, established by the space industry.

It is a related specific object of the present invention to provide such a separation mechanism that can readily be used or retrofitted into existing and planned space industry release systems to utilize typical pyrotechnic firing circuits and/or heater circuits to trigger the separation mechanism.

Additional objects, advantages, and novel features of the invention are set forth in part in the description that follows and will become apparent to those skilled in the art upon examination of the following description and figures or may be learned by practicing the invention. Further, the objects and the advantages may be realized and attained by means of the instrumentalities and in combinations particularly pointed out in the appended claims.

To achieve the foregoing and other objects and in accordance with the purposes of the present invention, as embodied and broadly described herein, the separation mechanism includes a self-aligning release assembly that can be selectively positioned into locked and released positions at which a fastener or other object is securely retained within and released from the separation mechanism, respectively. The release assembly is positioned within a protective housing that can be mounted via an included mounting base to a structure, e.g., a spacecraft storage bay, to facilitate deployment of instrumentation, power and communication equipment, and the like from the structure. The release assembly includes a flywheel with an internal bearing race, a plurality of bearing elements contacting the bearing race, a positioning element within and adjacent the flywheel for aligning and retaining the bearing elements, and a segmented nut centrally positioned within the flywheel with the outer surfaces of the nut segments abutting the bearing elements. In the locked position of the separation mechanism, the bearing elements forcibly urge the nut segments radially inward to retain a fastener or other objects and with an inward force sufficient to resist any outward forces applied by the retained object. When the flywheel is rotated to the released position, the positioning element aligns the bearing elements with recessed portions on the bearing race of the flywheel. The bearing elements roll into the recessed portions, and the segmented nut is separated, i.e., pushed radially outward by forces developed between the nut and the retained object during initial tightening, so as to release the retained object. The separation mechanism further includes an actuating assembly that utilizes shape memory alloy wires to trigger the mechanism by pulling or moving a latch from a toggle-locked position to an unlocked position at which one or more drive springs rotate the flywheel to the released position. The separation mechanism can then be reset, without rewiring or retesting, with accurate alignment of the bearings, the segmented nut, and other components to facilitate reuse of the separation mechanism.

BRIEF DESCRIPTION OF THE DRAWINGS

The accompanying drawings, which are incorporated in and form a part of the specification, illustrate preferred embodiments of the present invention, and together with the descriptions serve to explain the principles of the invention.

DETAILED DESCRIPTION OF THE PREFERRED EMBODIMENTS

The separation mechanism of the present invention shown in FIGS. 1–16 is useful for securely retaining an object, such as a cap screw or other fastener being used to secure another object to a structure, and upon receiving a signal, quickly and reliably releasing the object from the separation mechanism. To achieve this function, the separation mechanism utilizes bearings, and preferably anti-friction bearings, accurately positioned by a positioning element or bearing cage centrally located within a flywheel so as to contact an inner bearing race on the flywheel. The separation mechanism is triggered, i.e., the retained object is released, by rotating the flywheel so as to align the bearings with recessed portions on the flywheel's inner race thereby allowing a segmented nut to separate, i.e., push outward. To reset the separation mechanism and allow reuse, the flywheel can be readily rotated back to the original or lock position. Because the inventors anticipate that the separation mechanism will be particularly useful in the spacecraft to remotely deploy items such as solar arrays, communication antennae, and the like from storage bays, the following description of the preferred embodiments of the separation mechanism is set forth to particularly emphasize features of the invention that provide unique advantages important within the space industry. In addition to being resettable, the separation mechanism uniquely satisfies the design requirements of the space industry by providing redundancy of critical features, single fault tolerance, efficient and controlled power use, and wear and corrosion resistance. Because of these and other advantages of the present invention, the invention is not limited to spacecraft uses and would be useful in a variety of other application to release pins, bolts, keys, rods, and the like to release various payloads, trigger ordinances, and open or close devices including valves and hatches.

A separation mechanism 10 according to the present invention is shown in FIGS. 1–15. Generally, the separation mechanism 10 includes a self-aligning release assembly 20 for selectively retaining and releasing a retained object 15, shown for illustration, but not as a limitation, as a hex head cap screw. The separation mechanism 10 further includes an actuating assembly 80 that securely maintains the release assembly 20 in a locked or armed position and upon receiving a signal such as an electrical impulse, unlock or triggers the separation mechanism 10 to operate the release assembly 20 to release the cap screw 15 from the separation mechanism 10. As will be appreciated by those skilled in the art the load supported by the cap screw 15 generally ranges from 500 to 10,000 pounds, and the separation mechanism 10 may be readily designed and sized to operate at any point within this load range. A housing 14 and a cover 16 are included to protect internal components from contamination, to provide electrical insulation (i.e., the housing 14 and cover 16 are fabricated, in one preferred embodiment, from plastic or other suitable electrically non-conductive materials), to provide mounting surfaces, and to provide aligning surfaces (as will be further discussed in detail). The separation mechanism 10 is mounted to a structure (not shown), such as a spacecraft, attaching a circular or oblong mounting base 11 and 12, respectively, to the structure with standard fastening methods.

Figure 5:
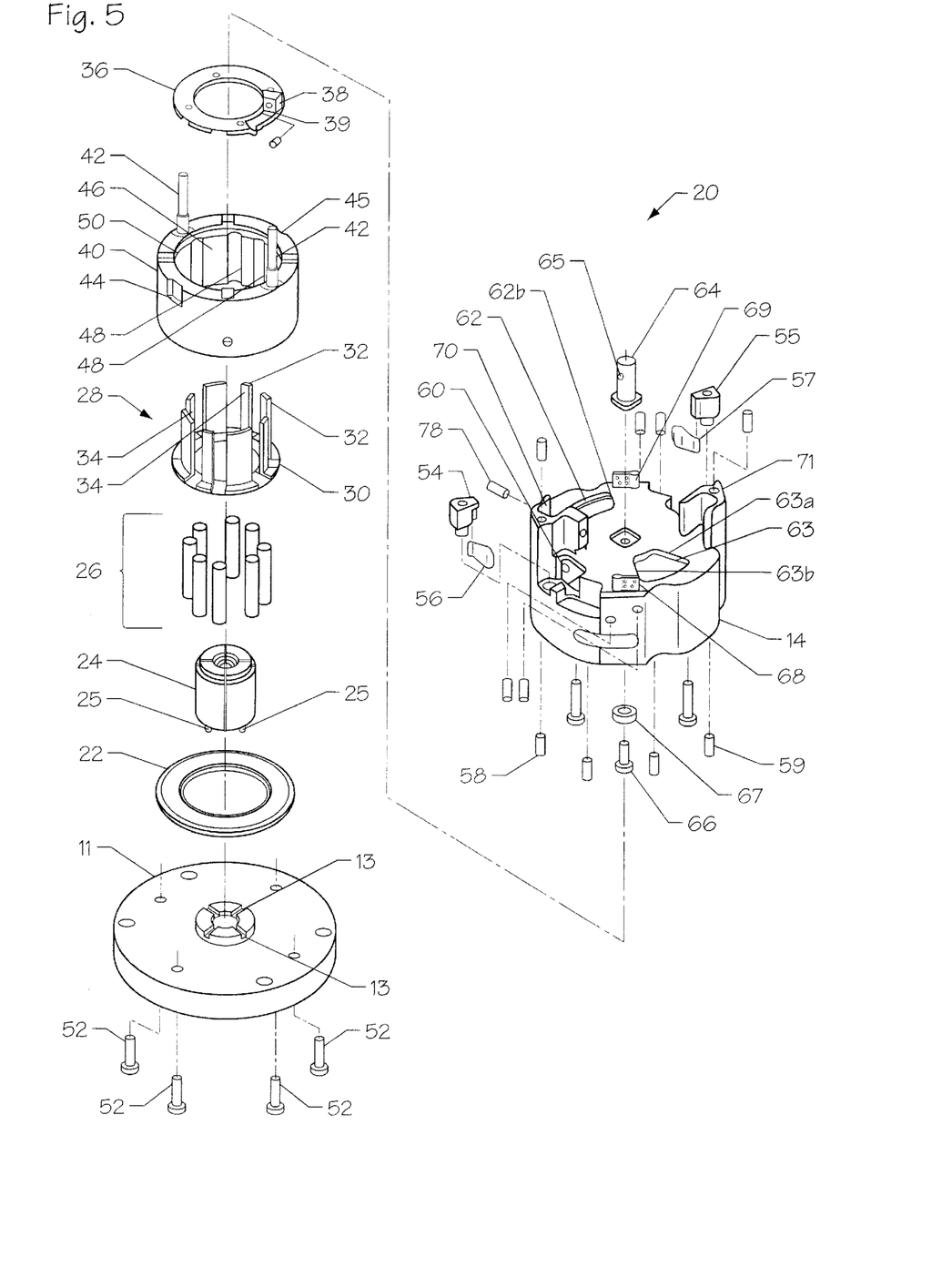
FIG. 5 is a partial, exploded, perspective view illustrating the separation mechanism of FIGS. 1–4, constructed in accordance with the present invention, showing components of and assembly of the separation mechanism and showing an alternate base element.

The self-aligning release assembly 20 illustrated in FIG. 5 provides the important function of retaining the cap screw 15 when the separation mechanism 10 is in a locked position, selectively releasing the cap screw 15 when the separation mechanism 10 is moved to a released or triggered position, and facilitating resetting the separation mechanism 10 to the locked position in a reliable manner that obviates the need for testing to verify alignment, i.e., the release assembly is self-aligning. Significantly, the self-aligning release assembly 20 is designed to achieve each of these functions without releasing any contaminants, as is a problem with pyrotechnic release devices, and with minimal vibration or shock, as is a problem with pyrotechnic and may other prior art release devices. Specifically, the inventors have determined that the separation mechanism 10 generates shock forces during release in the range of 60 to 500 Gs, depending on the overall size tested, contact materials employed, load on the cap screw 15, and other factors, while, in contrast, prior art pyrotechnic release devices typically develop shock forces ranging from 5,000 to 10,000 Gs, i.e., greater than ten times the shock forces as expressed in unites of gravitational force.

To retain and release the cap screw 15, the release assembly 20 includes a segmented nut 24. In the locked position of the separation mechanism 20, each of the nut 24 segments abuts adjacent segments to form a complete threaded nut into which the screw 15 can be threaded. The segmented nut 24 is shown with four segments but a smaller or larger number of segments could readily be used according to the invention. Additionally, although not shown, a number of segmented elements or collars could be substituted for the segmented nut 24 depending upon the object being retained. The important criterion is that the internal surfaces of the segmented element are configured to receive the end portion of the retained object. For example, if the retained object had a spherical end portion, a segmented collar having a hollow circular interior space with an end plate having a diameter less that the end portion when in the locked position would securely retain the end portion. As illustrated, the segmented nut 24 includes a guide 25 on each segment. When the release assembly 20 is assembled, the guides 25 fit into guide slots 13 in the mounting base 11. The guide slots 13 assist in assembly but, more important, control the outward movement of the nut 24 segments when the separation mechanism 10 is triggered and the inward movement of the nut 24 segments when the separation mechanism 10 is reset. In this manner, the guide slots 13 and the guides 25 work in combination to maintain alignment of the segmented nut 24 during the operation of the separation mechanism 10.

A unique feature of the present invention is the use of bearing devices and surfaces in direct contact with the segmented nut 24 to urge the nut 24 together and to allow the nut 24 to separate in the locked and released/triggered positions, respectively, of the separation mechanism 10. The use of bearing devices and surfaces, and more preferably anti-friction bearing devices and surfaces, increases the war resistance of the separation mechanism 10 and by reducing or controlling the amount of friction (especially starting friction), significantly reduces the amount of force, and in turn power, that is required to operate the separation mechanism 10. Additionally, the separation mechanism 10 provides the advantage of reduced maintenance or replacement costs, reduce failure risks, and reduced power consumption, all of which are particularly important for spacecraft applications. The reduced activation force also reduces the amount of shock and vibration forces produced during triggering or releasing when compared to prior art devices.

A number of anti-friction or rolling contact bearings can be used within the present invention. For example, but not as a limitation, the anti-friction bearings may be ball, roller, or needle bearings or even a combination thereof. Although the use of bearings different from those illustrated will require a change in the design of the positioning element 28 and the flywheel 40, to be discussed below, these changes could be readily achieved by one skilled in the art and will, therefore, not be discussed in detail but are to be considered part of the present invention. Similarly, the material may generally be any well-known bearing material that provides wear resistance and corrosion resistance (for resisting the often demanding coastal pre-launch environments in the space industry).

As illustrated in FIG. 5, the release assembly 20 includes eight bearing elements 26, i.e., roller bearings, to provide intermediate contact surfaces between the flywheel 40 and the segmented nut 24. Roller bearings provide the advantage of low initial and running friction forces which reduces the power required to operate the release assembly 20 and the amount of wear on any individual contact surface. The elongated shape of roller bearing also better distributes the contact forces along the full length of the segmented nut 24, rather than applying the force on a single point or small areas, which, depending on the magnitude of contact forces, can control or eliminate the problem of Brinnelling or denting of contact surfaces on the flywheel 40 or the segmented nut 24. Although one or more bearing elements 26 may be provided for each segment of the nut 24, two bearing elements 26 are generally preferred to provide a good distribution of contact forces, i.e., one half the contact force from each nut 24 segment on each bearing 26, while maintaining the simplicity of design of the positioning element 28 and the flywheel 40.

The release assembly 20 includes a flywheel 40 and a positioning element 28, i.e., a bearing cage or retainer, to position and align the bearing elements 26 against the segmented nut 24 and the flywheel 40. The flywheel 40 includes an inner bearing race 46 against which the bearing elements 26 are urged by the segmented nut 24. As will be understood by one skilled in the art, the initial threading of a fastener, such as cap screw 15, into a threaded device or nut, such as segmented nut 24, creates preloading in the fastener which is translate to radial force acting radially outward to push apart the abutting surfaces of the fastener and the threaded nut. In the illustrated release assembly 20, when the cap screw 15 is threaded into the segmented nut 24 outwardly directed radial forces urge the segments of the nut 24 outward and against adjacent bearing elements 26 which are, in turn, pushed against the bearing race 46 of the flywheel 40.

Figure 9:
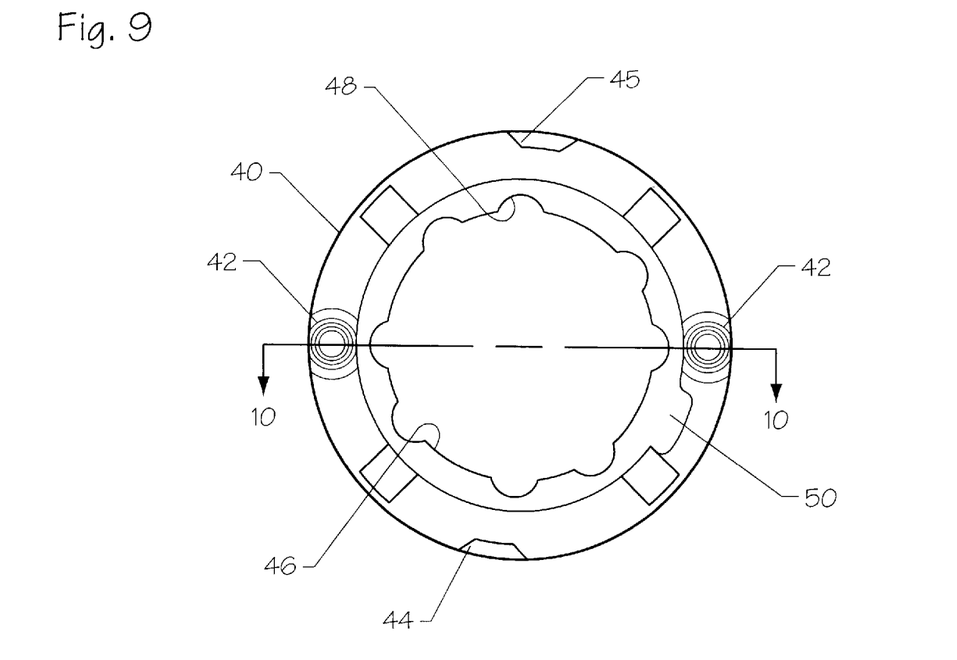
FIG. 9 is an enlarged plan view illustrating a flywheel of the separation mechanism shown in FIG. 5, constructed in accordance with the present invention, to show recessed portions on the bearing support surface.
Figure 10:
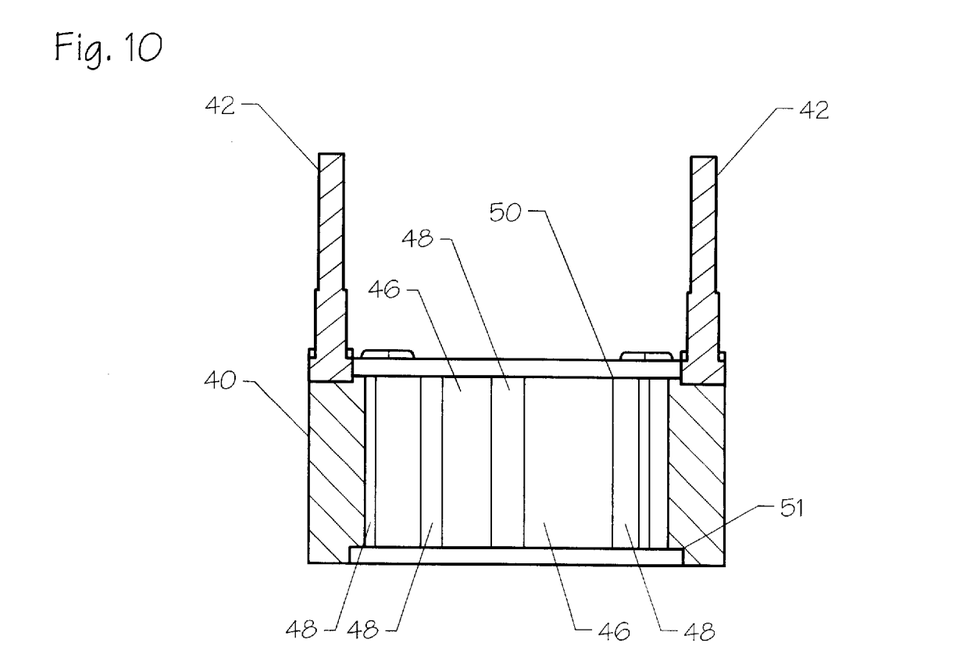
FIG. 10 is a sectional view illustrating the flywheel of the separation mechanism of the present invention, taken along line 10—10 of FIG. 9, constructed in accordance with the present invention.
Figure 11:
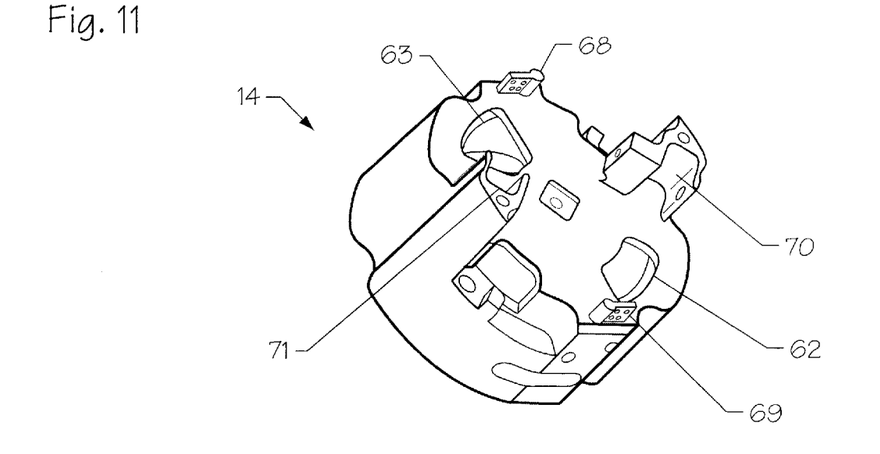
FIGS. 11–13 are perspective view of a housing of the separation mechanism shown in FIG. 5, constructed in accordance with the present invention.
Figure 12:
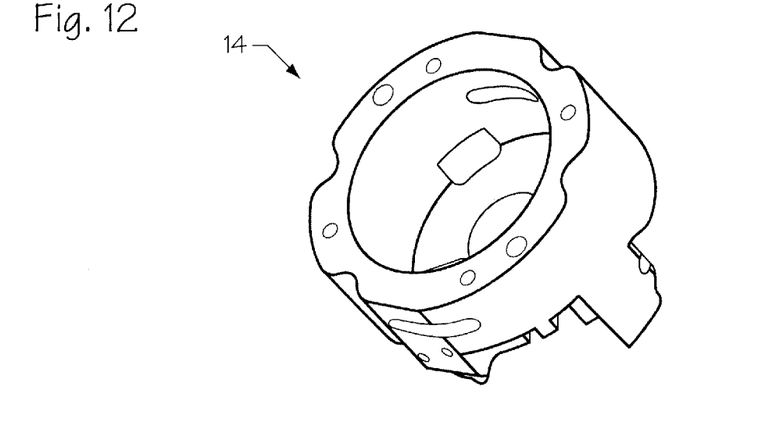
Figure 13:
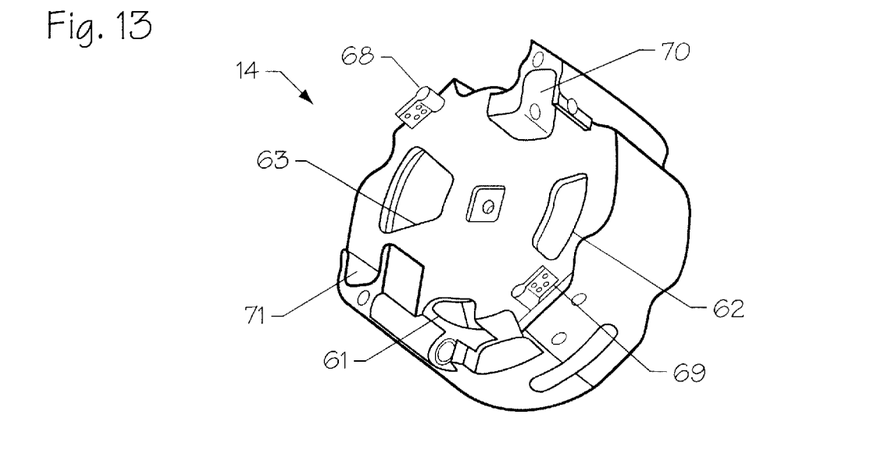
Figure 14:
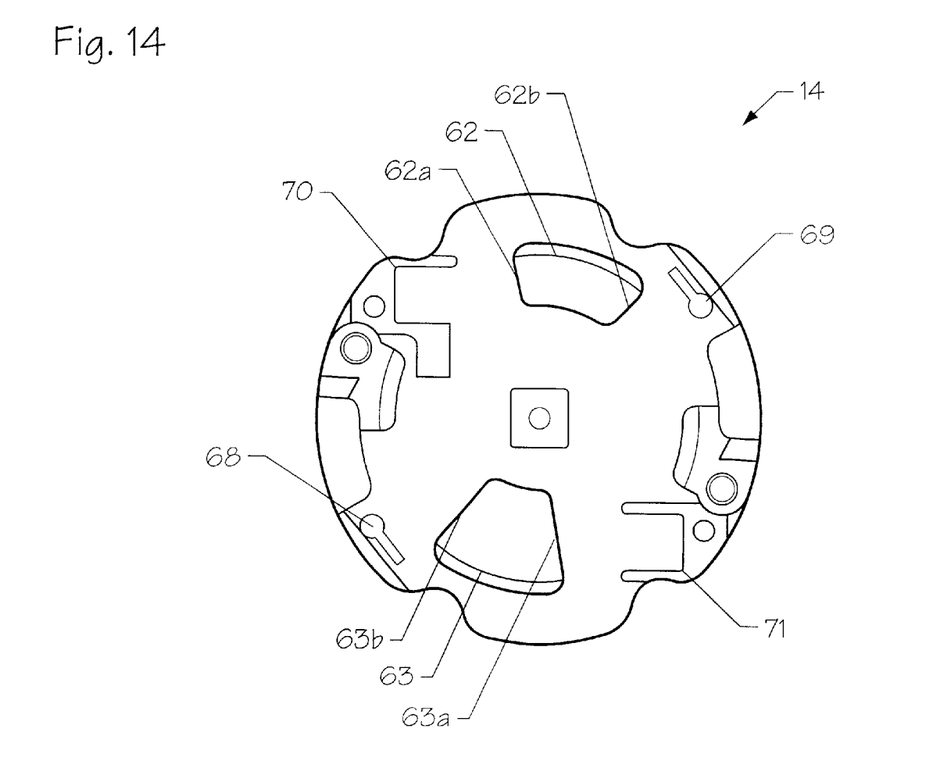
FIG. 14 is a plan view of the housing shown in FIGS. 11–13, constructed in accordance with the present invention.

Referring to FIGS. 5, 9, and 10, the flywheel 40 with its unique bearing race 46 is an important feature of the present invention because it can be rotated within the release assembly 20 to a released or triggered position to allow the segmented nut 24 to move outward and release the cap screw 15 and it also can be rotated back to the locked or armed position to reset the release assembly 20 for reuse by moving the segmented nut 24 back into a substantially unitary form. In the locked position, the bearing elements 26 contact the bearing race 46 which counteracts the outward force on the bearing elements 26 to keep the segments of the nut 24 together in abutting contact or, more preferably, with a small space between each segment of the nut 24 to minimize frictional forces or binding difficulties during separation and resetting. However, when it is desired to separate the nut 24, the flywheel 40 can be rotated to align the bearing elements 26 with recessed portions 48 on the bearing race 46. When alignment is achieved, the preload forces act to urge the nut 24 segments and the abutting bearing elements 26 radially outward and the bearing elements 26 smoothly roll, reducing shock and vibration, into the recessed portions, thereby releasing cap screw 15. The recessed portions 48 will, of course, be equal in number to the bearing elements 26, and have depth sufficient to allow the segments of the nut 24 to separate a distance adequate to provide complete clearance between the threads of the cap screw 15 and the threads of the segmented nut 24 to prevent damaging of either component as the cap screw 15 rapidly passes through and out of the release assembly 20. The guide slots 13 in the mounting base 11 preferably are long enough to maintain contact with the guides in the nut 24 segments to align the nut 24 within the release assembly 20.

To facilitate alignment between the bearing elements 26 and the recessed portions 48 of the bearing race 46, the positioning element 28 is inserted into the flywheel 40 but, significantly, is free to rotate independently of the flywheel 40. When the flywheel 40 is rotated to the released position, the positioning element 28 remains relatively stationary or, at least, is rotated to a lesser degree than the flywheel 40. The positioning element 28 includes a bottom end plate 30 which mates with a lower receiving surface 51 of the flywheel 40. Side plates 32 extend upward from the bottom end plate 30 to define grooves 34 in which the bearing elements 26 are positioned. The grooves 34 have a width slightly larger than the diameter of the bearing elements 26 and a height slightly larger than the height of the bearing elements 26 to allow the bearing elements 26 to move in and out of the recessed portions while maintaining adequate control over the bearing elements 26 for positioning and alignment within the release assembly 20. A top end plate 36 is rigidly fastened by staking or other standard methods to the tops of the side plates 32. The top end plate 36 provides a mating surface between the positioning element 28 and an upper receiving surface 50 of the flywheel 40.

The top end plate 36 includes a stop 38 for providing alignment of the positioning element 28, and the retained bearing elements 26, within the release assembly 20. The stop 38 preferably extends above the top of the flywheel 40 such that when the housing 14 is placed over the flywheel 40 and positioning element 28 the stop 39 extends out of a pivot pin guide slot 63 (as will be discussed in more detail, one of the spring pivot pins 42 also extends through the slot 63), see FIGS. 5 and 11–14. The stop 38 is located on the top end plate 36, relative to the grooves 34, such that when the stop 38 is in abutting contact with the edge 63a of the pivot pin guide slot 63 the positioning element 28 and the bearing elements 26 are in locked or armed position. In the above manner, the features of the positioning element 28 enable the initial locking positioning, released positioning, and aligned resetting of the bearing elements 26.

To facilitate rotation and positioning of the flywheel 40 within the release assembly 20, the flywheel includes two spring pivot pins 42 that extend outside the housing 14 of the release assembly 20 so that one or more driving forces can be applied to the pins 42 to rotate the flywheel 40 between the locked end released positions (as will be discussed in more detail). To further facilitate movement of the flywheel 40, the release assembly 20 includes a bearing ring 22 upon which the lower surface of the flywheel 40 rests. The bearing ring 22 may be a number of bearing and friction reducing elements, such as a needle bearing race (not shown). The flywheel 40 is free to rotate within the release assembly with lateral and axial movement prevented or minimized by the minimal clearance between the flywheel 40 and the internal surfaces of the housing 14, see FIGS. 11–14. Referring to FIG. 5, the housing 14 is slid over the flywheel 40, as well as the positioning element 28, bearing ring 22, segmented nut 24, and bearing elements 26, and rigidly fastened to the mounting base 11 with base screws 52.

The release assembly 20 is designed to provide alignment and correct positioning i.e., in the locked and released position, and/or to limit travel of the flywheel 40. This is achieved by including pivot pin guide slots 62, 63 in the housing 14 through which the spring pivot pins 42 extend. In the locked position, the spring pivot pins 42 contact or abut the edges 62a and 63a of the guide slots 62 and 63, respectively. When the separation mechanism 10 is triggered and rotates clockwise to the released position, the spring pivot pins 42 move within guide slots 62 and 63 until the pins 42 contact the edges 62b and 63b, respectively. At this point, i.e., in the released position, the bearing elements 26 are aligned with the recessed portions 48 of the bearing race 46 on the flywheel 40 and the segmented nut 24 separates to release the cap screw 15. In addition to aligning the components for release or separation, the amount of travel of the flywheel 40 is kept relatively short to limit the buildup of momentum energy and the corresponding shock and vibration forces experienced upon impact of the pins 42 against the housing 14.

Figure 15:
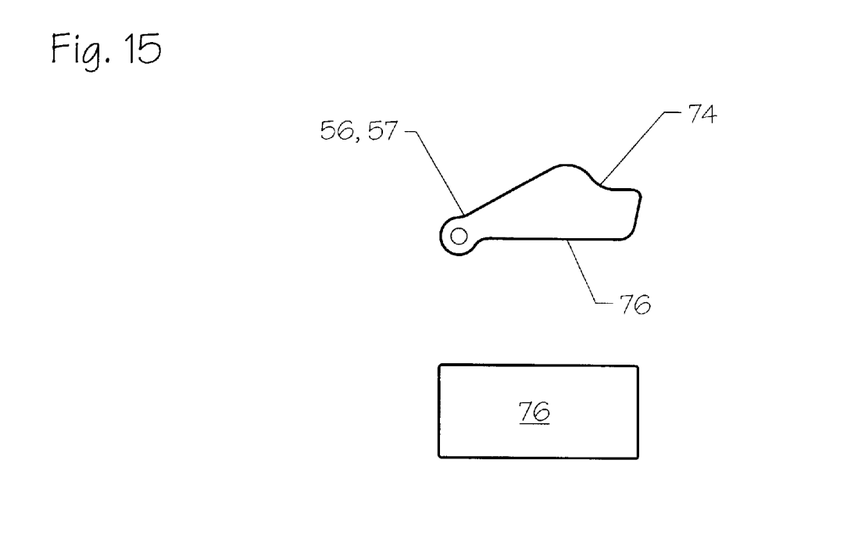
FIG. 15 is an enlarged side and plan view of the toggle of the present invention shown in FIG. 5, constructed in accordance with the present invention.

Another important feature of the present invention is the advantageous method provided for maintaining the flywheel 40 in the locked or armed position until it is desired to rotate the flywheel 40 to the released or triggered position. This feature is, at least in part, achieved by including a pair of latch mechanisms. The use of two latch mechanisms is important for providing single fault tolerance for the release assembly 20. If one latching mechanism were to fail or become unaligned, the other latching mechanism is designed to have sufficient strength to provide the locking function by itself. Although numerous latching mechanisms can be envisioned, the inventors have found a pivotable toggle latch mechanism to be effective. As illustrated in FIGS. 5 and 15, toggles 56, 57 have a unique shape that is in part defined by the angle, which can range from 10 to 60 degrees but is preferably about 30 degrees. This shape, including the rounded edges (particularly, the rounded shoulder of contact surface 74), allows the toggles 56, 57 to counter or resist forces applied to the contact surface 74 while also preventing binding and wear when the latch is released, i.e., toggles 56, 57 are moved away from contact, and a surface abutting and applying force to contact surface 74 rubs or abuttingly contacts the rounded shoulder of contact surface 74 rather than a sharp edge.

The toggles 56, 57 are attached to the housing 14 with toggle pivots 54 and 55, respectively, which are inserted into the housing 14 and fastened with retention pins 58 and 59, respectively. The toggles 56, 57 are free to pivot about posts on toggle pivots 54, 55 with a limited range of motion of less than about 90 degrees. The flywheel 40 includes toggle notches 44 and 45 for receiving the toggles 56 and 57, respectively. When the separation mechanism 10 is in the locked or armed position, the toggles 56 and 57 extend through toggle windows 60 and 61, respectively, on the housing 14 and engage the flywheel 40 at the toggle notches 44, 45. As will be discussed in more detail, the toggles 56, 57 are held against the flywheel 40 by the positioning of a latch 90, see FIG. 6, immediately behind and adjacent the toggles 56, 578 to abut back edge 76 of each toggle 56, 57. When the separation mechanism 10 is triggered, the latch 90 is rotated counterclockwise and out from behind the toggles 56, 57. The flywheel 40 then begins to rotate clockwise and because of the angular shape of the toggles 56, 57 and the rounded shoulder of the contact surface 74 which contacts the chamfered notches 44 and 45, respectively, the toggles 56, 57 are smoothly pushed radially outward and they flywheel 40 allowed to rotate to the released position. To reset and lock the release assembly 20, the flywheel 40 is rotated in the counterclockwise direction and the toggles 56, 57 are urged inward by the lath 90 which is rotated clockwise to its locked or armed position. The location of the toggle 56k, 57 on the housing 14 and of the toggle notches 44, 45 on the flywheel 40 are carefully selected such that these components are adjacent when the flywheel 40 is in the locked position, i.e., the pins 42 are abutting the edges 62a, 63a of the pivot pin guide slots 62, 63. In this manner, the present invention again improves the ease at which the separation mechanism may be reset with proper alignment and avoiding the need for retesting, rewiring, and reassembly.

Figure 6:
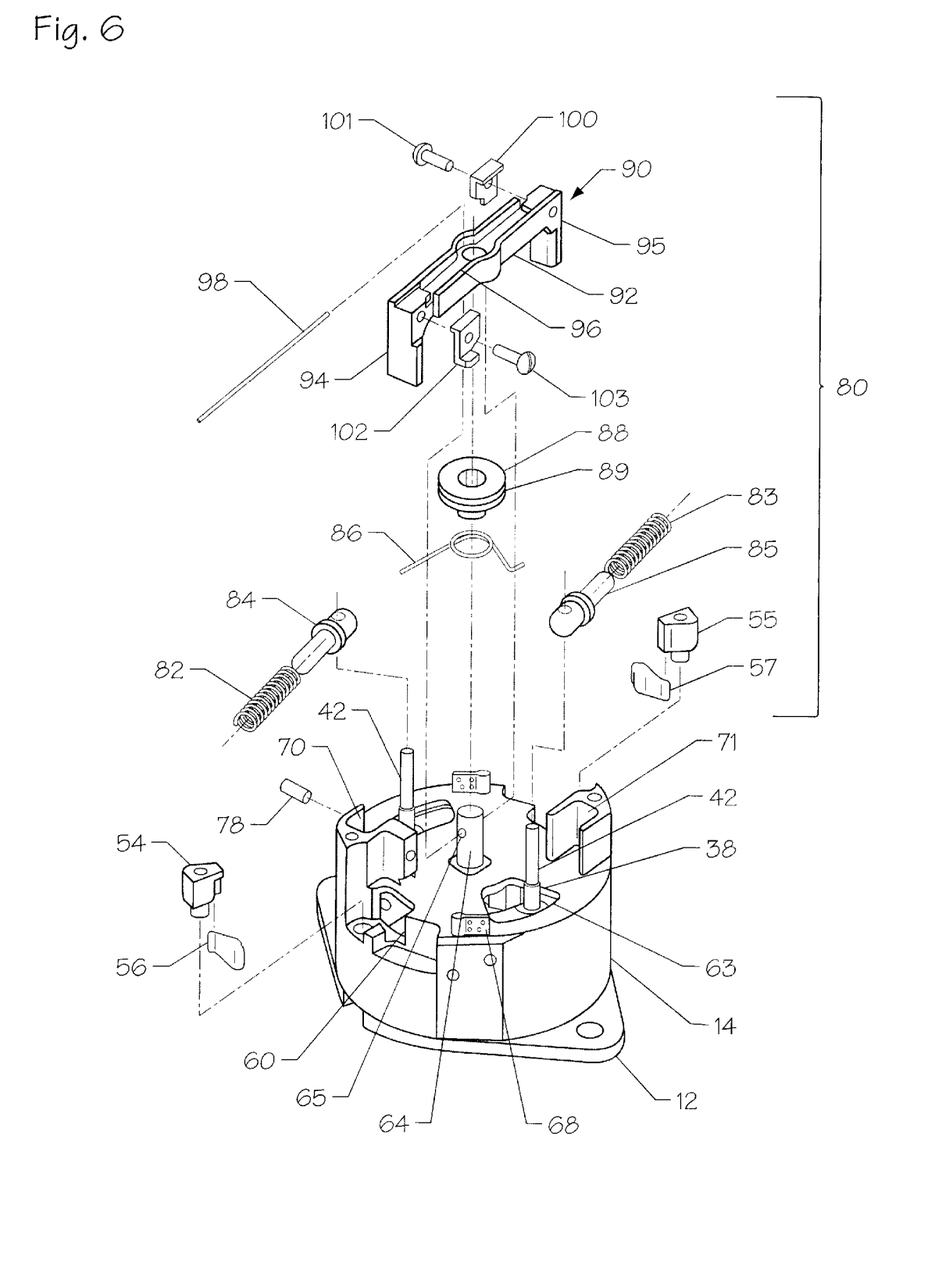
FIG. 6 is a partial, exploded, perspective view illustrating the separation mechanism of FIGS. 1–5, constructed in accordance with the present invention, showing components of and assembly of an actuating assembly of the separation mechanism, with the base element shown in FIGS. 1–4.

The present invention further includes several unique aspects incorporated within an actuating assembly 80 illustrated in FIG. 6. The actuating assembly 80 provides the important functions of the retaining the release assembly 20 in the locked position, maintaining desired locations of the positioning element 28, and rotating the flywheel 40 to the released position. The actuating assembly 80 accomplishes each of these functions with minimal power use and with redundant features that provide single-fault tolerance.

Figure 7:
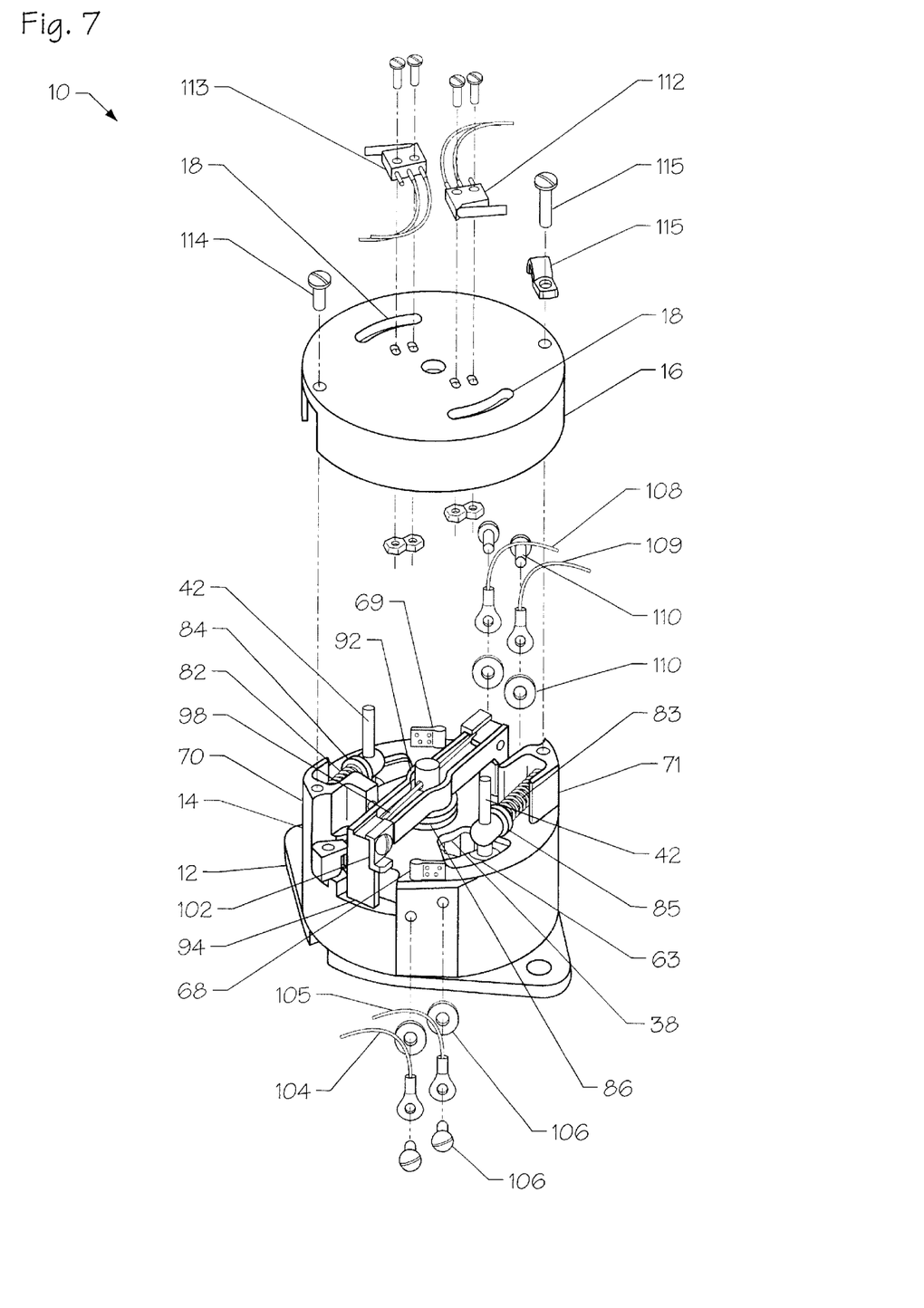
FIG. 7 is a partial, exploded, perspective view illustrating the separation mechanism of FIGS. 1–6, constructed in accordance with the present invention, showing installation of control wiring and a cover.
Figure 8:
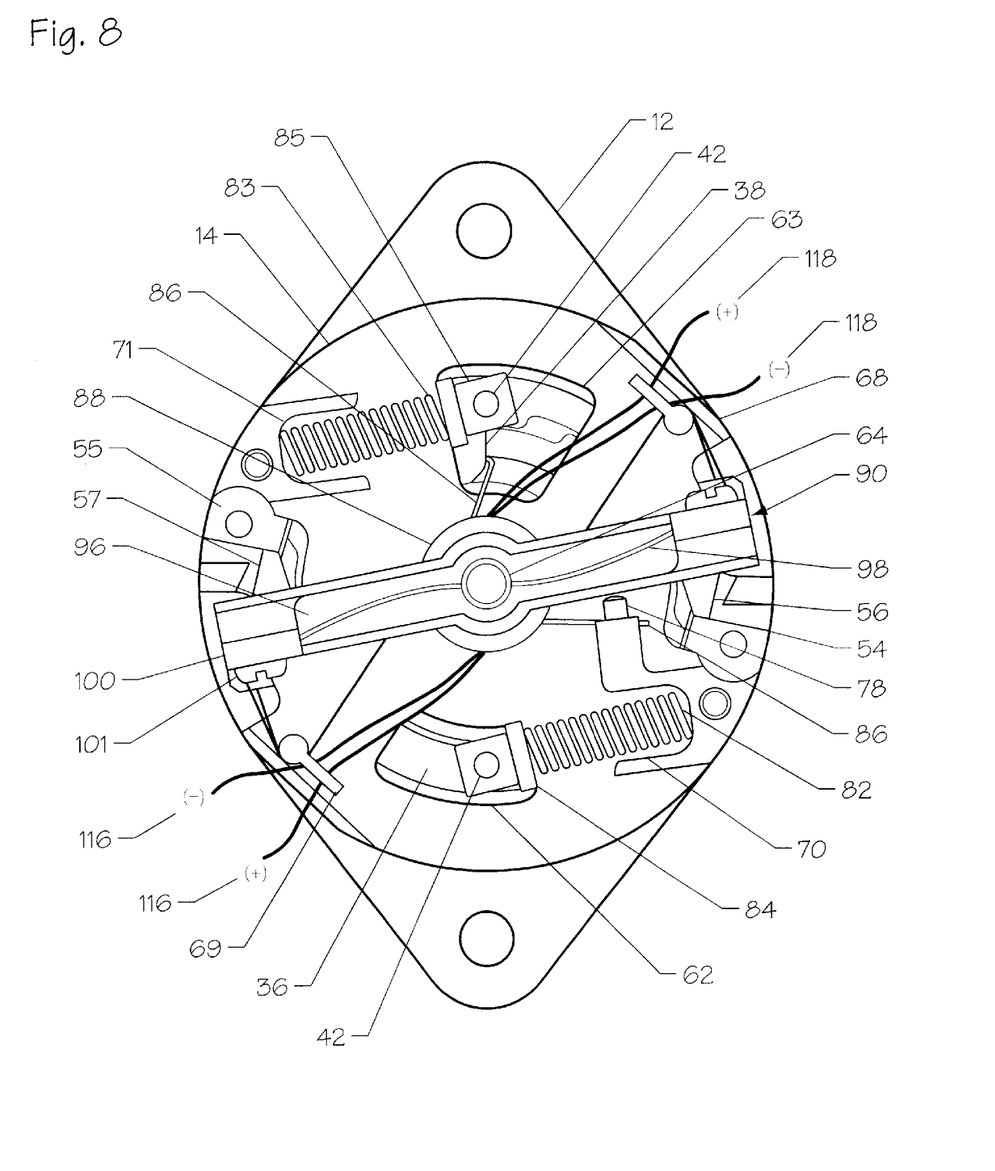
FIG. 8 is a plan view illustrating the separation mechanism of FIG. 6, constructed in accordance with the present invention, after assembly of the individual components and illustrating the routing or path of shape memory allow wires within the actuator assembly.

To rotate the flywheel 40 to the released position, the actuating assembly 80 includes drive members 82, 83 as illustrated in FIGS. 6–8. Generally, the drive members 82, 83 utilizes stored or potential energy that when release can quickly rotate the flywheel 40 to the released position. In this regard, it is preferable that either drive member 82, 83 store enough potential energy to be able to individually rotate the flywheel 40. The stored energy must be adequate to overcome the initial and ongoing resistive forces and, particularly, the friction forces between the various mating surfaces as discussed above in detail. Although many energy storage devices may be employed in the present invention, in the illustrated embodiment, the drive members 82, 83 are springs that are held in compression in the locked position of the separation mechanism 10 and release the stored energy when the separation mechanism 10 is triggered. The application of the spring fore to the flywheel 40 is controlled by mounting the drive members 82, 83 on pivot elements 84 and 85, respectively which in turn are pivotally mounted on the spring pivot pins 42 of the flywheel 40. The free end of the drive members 82, 83 is placed in contact with spring collars 70 and 71, respectively, of the housing 14. FIG. 8 illustrates the locked position of the actuating assembly 80 in which the drive members 82, 83 are held in compression. Although not shown, it will be readily apparent that when the actuating assembly 80 is triggered, i.e., the flywheel 40 is allowed to rotate, the drive members 82, 83 will translate stored energy from the compression of the drive members 82, 83 to a linear force against the pivot elements 84, 85 and the corresponding spring pivot pins 42 of the flywheel 40. In this manner, the flywheel 40 is quickly rotated in the clockwise direction until the pins 42 contact the edges 62b, 63b of the pivot pin guide slots 62, 63 at which point the flywheel is in the released position.

The actuating assembly 80 is operable to effectively retain or lock the flywheel 40 and the drive members 82, 83 in the locked position shown, in FIG. 8. To achieve this function, the actuating assembly 80 includes the latch 90 which is pivotally attached to the housing 14 by placing the latch 90 upon a lever pivot pin 64 located on the axis of the separation mechanism 10. The lever pivot pin is rigidly attached to the housing 14 with screw 66 and spacer nut 67. The latch 90 comprises a cross member 92 that extends substantially across the diameter of the housing 14 with a recessed surface 96 for containing a retention element 98 (discussed in detail below). Extending downward toward the housing 14 at diametrically opposing ends of the cross member 92 are arms 94, 95. In the locked position, the arms 94, 95 contact the toggles 56 and 57, respectively and keeps the toggles 56, 57 in abutting contact with the toggle notches 44, 45 respectively, of the flywheel 40, thereby preventing the flywheel 40 from being rotated by the drive members 82, 83. When the latch 90 is rotated counterclockwise, contact between the arms 94, 95 and the toggles 56, 57 is interrupted and the drive members 82, 83 promptly release stored energy to rotate the flywheel 40 in the clockwise direction. The rotation of the flywheel 40 causes the toggles 56, 57 to be pushed out of the toggle notches 44, 45, and the separation mechanism 10 is unlatched or unlocked and is in the released position.

The inventors recognize that in many applications it will be important for the separation mechanism 10 to withstand a large amount of vibration without being inadvertently triggered or released, such as during the launch of a spacecraft. To provide a type of safety lock, the actuating assembly 80 includes the retention element 98 to provide sufficient forces acting to resist rotation of the latch 90 in the counterclockwise direction so that vibratory forces do not accidentally trigger the separation mechanism 10. Although other devices and designs may be employed to accomplish this "safety" function, one preferred embodiment is to fabricate retention element 98 from a length of spring wire (for example, but not as a limitation, about 1.5 inches of 0.023-inch diameter spring wire such as Stock No. CFW-191-023 from California Fine Wire, Co.) or the like. The length selected should be slightly longer than the length of cross member 92 so that when it is installed the spring wire takes on the S-shape shown in FIG. 8, with the specific shape and length of the retention element 98 depending on the length of the cross member 92 and the amount of retaining force that is desired, i.e., anticipated vibratory or other potentially triggering external forces. The retaining force is applied against the cross member 92 by positioning the retention member 98 within the recessed surface 96 so as to pass through a hole 65 in the stationary, lever pivot pin 64 and attaching the opposite ends of the retention member 98 to the cross member 92 with fasteners 100, 101, 102, and 103. When so positioned, the retention element 98 applies a force at each end of the cross member 92 that urges the latch 90 to rotate in the clockwise direction and maintain the actuating assembly 80 in the locked position.

Referring to FIG. 8, the positioning of the cross member 92 in the locked position is enhanced by the use of a bumper 78 which is rigidly fastened in the spring collar 70 on the housing 14. As illustrated, the travel or rotation of the lath 90 in the clockwise direction is limited by the bumper 78 which contacts the cross member 92 of the latch 90. The bumper 78 is positioned and sized such that the latch 90 is positioned in the locked position, i.e., contacting the toggles 56, 57, when the bumper 78 contact the cross member 92.

As discussed earlier, the positioning element 28 of the release assembly 20 preferable remains stationary or only rotates slightly relative to the flywheel 40 when the flywheel 40 is rotated clockwise from the locked to the triggered or released position. This is accomplished by including a return spring 86 which is positioned on a guide 88 that is slid onto the leer pivot pin 64 but not fastened to allow free rotation of the guide 88 to control friction and war. The guide 88 includes a lower annular surface with an outer diameter corresponding to the inner diameter on a loop of the return spring 86 to provide a relatively tight fit as the return spring 86 may be installed by temporarily expanding the diameter of the loop and then releasing the return spring 86 to contact the guide 88. The hook or bent end of the return spring 86 is passed into the hole 39 on the stop 38 of the top end plate 36 o the positioning element 28. The straight end of the return spring 86 is placed in abutting contact with the spring collar 70. As shown in FIG. 8, the return spring 86 is installed at an inclusive angle that is significantly smaller than the at rest inclusive angle so that the return spring 86 applies a force against the stop 38 that resists clockwise rotation of the positioning element 28. If the spring force developed does not prevent the positioning element 28 from moving a limited distance with the flywheel 40, the return spring 86 preferably has adequate develop spring force to promptly return the positioning element 28 back to its initial position by rotating the positioning assembly 28 counterclockwise until the stop 38 contacts the edge 63*a* of the pivot pin guide slot 63. In this way, the positioning assembly 28, and the bearing elements 26 contained therein, are positioned to unsure alignment of the bearing elements 26 with the proper sections of the bearing race 46 of the flywheel. These features illustrate another way in which the separation mechanism 10 provides features that create a self-aligning release device.

Actuation of the separation mechanism 10 is advantageously achieved through the use of shape memory alloy (SMA) technology. As will be appreciated by those skilled in the art, SMAs are generally metal alloys, such as TiNi (Nitonal), CuAlNi, and TiNiPd, that can be characterized as easily deformed when cold, i.e., at temperatures below the phase change transition temperature of the alloy, but being able to develop large stresses or forces when heated through the phase change transition temperature of the alloy to recover about 3 percent. In other words, an SMA wire can be employed that has a given length that when heated will develop a tensile force along its length as the wire contracts about 3 percent in length. The heating of the SMA wire through its phase change temperature can readily be accomplished by taking advantage of well-known process of resistance heating in metal alloy wiring. For example, a relatively standard impulse or signal of current (AC or DC) having a magnitude of about 5 amps may be applied to a 8 mils Nitinol wire for a period of time between 20 to 30 milliseconds to heat the Nitinol wire through the phase change temperature and result in shape recovery and a tensile force of about 1 to 2 pounds. The size of the wire and the alloy used may be varied to achieve the desired tensile force with a larger wire providing more force but generally requiring more power to adequately heat to achieve shape recovery. Of course, when the wire is allowed to cool, it returns, i.e., lengthens, to its cold temperature length. Additionally, the heating of the wire must be carefully controlled to provide enough heat to heat the wire through its phase change temperature range, typically between 90° to 110° C., but removing heat before the annealing temperature, typically between 200° C. and 250° C., of the wire material is reached to prevent annealing the wire which may change or destroy the SMA properties of the wire.

In the present invention, SMA technology is utilized by including two SMA actuator wires 116 and 118. In a preferred embodiment, the actuator wires 116, 188 comprise 8-mil. Nitinol wires but a number of other SMA alloys and wire diameters may be readily substituted according to the invention. The actuator wires 116, 188 are used to actuate the separation mechanism 10 by pulling on the latch 90 to rotate it counterclockwise and allow the toggles 56, 57 to be pushed aside by the translation of stored energy in the drive members 82, 83 into spring force. Additionally, to provide redundancy in the design of the separation mechanism 10, it is preferable that either actuator wire 116, 118 be able to rotate the latch 90 individually, thereby allowing for single failures such as a failure of the electric supply to either actuator wire 116, 118, misalignments, and breakage of one actuator wire 116, 188. The main resistive force, in addition to friction forces, the actuator wires 116, 188 must overcome is the force developed by the retention element 98 that urges the latch 90 to rotate in the clockwise direction. In this regard, each actuator wire 116, 118 should be selected to provide at least enough tensile force to overcome the force of the retention element 98. To make more efficient use of the developed tensile forces, the wire 116, 118 may be doubled-stranded to double the developed force in each wire, i.e., from 1 to 2 pounds to 2 to 4 pounds per actuator wire 116, 118. Additionally, the path of each actuator wire 116, 118 is carefully selected to effectively use substantially all of the force developed in each strand of the actuator wire 116, 118.

As best illustrated in FIGS. 6 and 8, the actuator wires 116, 118 are trained or threaded in paths defined by components mounted on or an integral part of the housing 14 and the latch 90. Looped ends of the actuator wires 116, 118 are attached to opposite ends and opposite sides of the cross member 92 through holes in wire pulls 100 an 102, respectively. The actuator wires 116, 118 are then threaded around a curved portion of outer wire guides 68, 69 which are rigidly mounted on the housing 14 and then through holes on outer wire guides 68, 69. The path of the actuator wires 116, 118 then brings them into contact, on diametrically opposing sides, with the guide 88 and places each strand of the actuator wires 116, 118 in a groove 89 on the sides of the guide 88. The actuator wires 116, 118 are then trained through holes on the opposite (then originally wired) outer wire guides 69 and 68, respectively. The ends of the actuator wires 116, 118 are then attached to the current input wires (positive and negative) 108 and 109, 104 and 105, respectively, by fasteners 110 and 106, respectively. The current input wires 104, 105, 108, and 109 can be connected to any suitable power source (not shown) such as a battery or generator.

During operation, the actuator wires 116, 118 are kept below the phase change transition temperature of the selected SMA, generally by not applying any current to the actuator wires 116, 118 when the separation mechanism 10 is in the locked or armed position. In this locked position, the actuator wires 116, 118 are in a deformed or longer state. To trigger or actuate the separation mechanism 10, electrical impulses, e.g., 3.5 to 5.5 amps for 20 to 50 milliseconds which is a typical electrical firing pulse or 0.5 mps for about 30 seconds when a typical heater circuit is used to trigger the separation mechanism 10, are passed through the current input wires 104, 105 and 108, 109 and through the actuator wires 118, 116, respectively. This results in the actuator wires 16, 118 being heated through the phase change transition temperatures of the SMA of the wire and results in a shape change, i.e., shortening of the wires of approximately 3 percent, and a tensile force of approximately 1 to 2 pounds in each strand (2 to 4 pounds for a double stranded wire, such as actuator wires 116, 118 as illustrated). The force is applied to each end of the cross member 92 of the latch 90 via the wire pulls 100, 101 to rotate, e.g., forcefully pull, the latch 90 in the counterclockwise directions and to overcome the resistive force applied by the retention element 98. When the arms 94, 95 of the latch 90 are pulled clear of the toggles 56, 57, the drive members 82, 83 push the toggles 56, 57 out of the toggle notches 44, 45 and rotate the flywheel 40 in the clockwise direction to the released position where the bearing elements 26 align with the recessed portions 48 and allowing the segmented nut 24 to separate. After the separation mechanism 10 is operated to release the cap screw 15, the actuator wires 116, 118 can be allowed to cool through the phase change transition temperature of the SMA of the wire and return to the deformed and longer state, thereby acting, at least in part, to reset the separation mechanism 10 for reuse. This resetting function is enhanced by the retention element 98 which further urges the latch 90 to rotate clockwise back to the locked position.

The separation mechanism 10 further includes a protective cover 16 to protect the actuating assembly from physical damage, from contamination, and to electrically insulate internal components, see FIG. 7. The cover 16 is rigidly attached to the housing 14 with fasteners 114, 115. Significantly, the cover 16 includes grooves 18 through which the ends of the spring pivot pins 42 extend. By extending the pins 42 outside the cover 16, the separation mechanism 10 can be readily reset without disassembly with a tool that contacts and/or grasps the pins 42 and rotates the flywheel 40 counterclockwise until the pins 42 contact the edges 62a, 63a and the toggles 56, 57 are positioned back into the toggle notches 44, 45.

Figure 1:
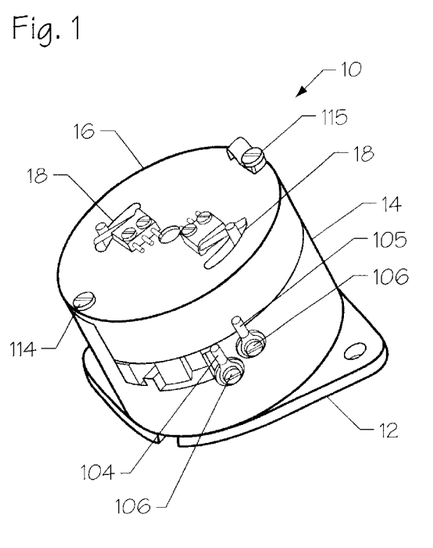
FIGS. 1 and 2 are perspective views illustrating a separation mechanism, constructed in accordance with the present invention.
Figure 2:
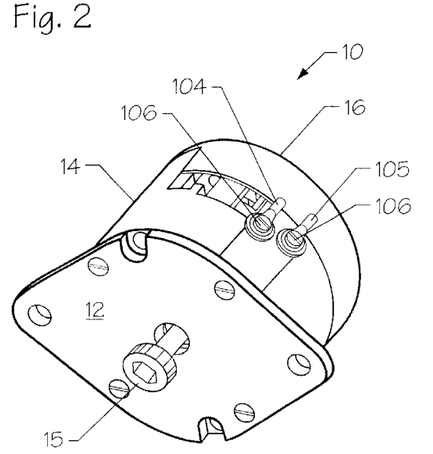
Figure 3:
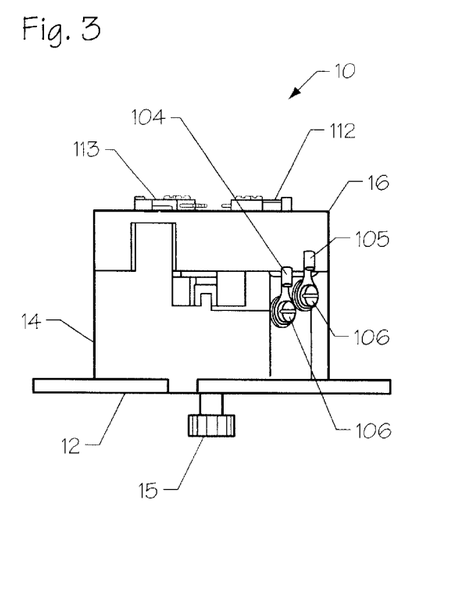
FIG. 3 is a side elevational view illustrating the separation mechanism shown in FIGS. 1 and 2, constructed in accordance with the present invention.
Figure 4:
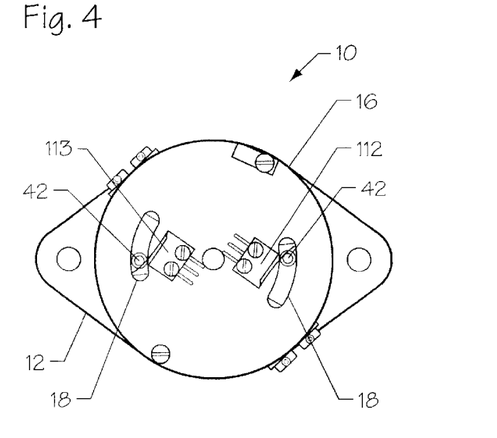
FIG. 4 is a plan view illustrating the separation mechanism shown in FIGS. 1 and 2, constructed in accordance with the present invention.

The extensions of the pins 42 outside of the cover also allows the position, i.e., locked or released, of the separation mechanism 10 to be readily monitored. In this regard, the separation mechanism 10 may include position indicators 112, 113 that can be rigidly mounted onto the cover 16 so as to be adjacent to the grooves 18. Referring to FIG. 4, the separation mechanism 10 is shown in the locked position with the pins 42 contacting the position indicators 112, 113. This contact can be used to complete an electric circuit to determine when to transmit a signal to a location remote to the separation mechanism 10 indicating that the mechanism 10 is locked or armed. When this contact is interrupted, the position indicators 112, 113 may be operable to transmit a signal to the remote location that the separation mechanism 10 has been triggered or the retained object released. Alternately, the continuity of a position circuit (not shown) that includes the position indicators 112, 113 may be periodically or continuously tested by instrumentation (not shown).

Figure 16A:
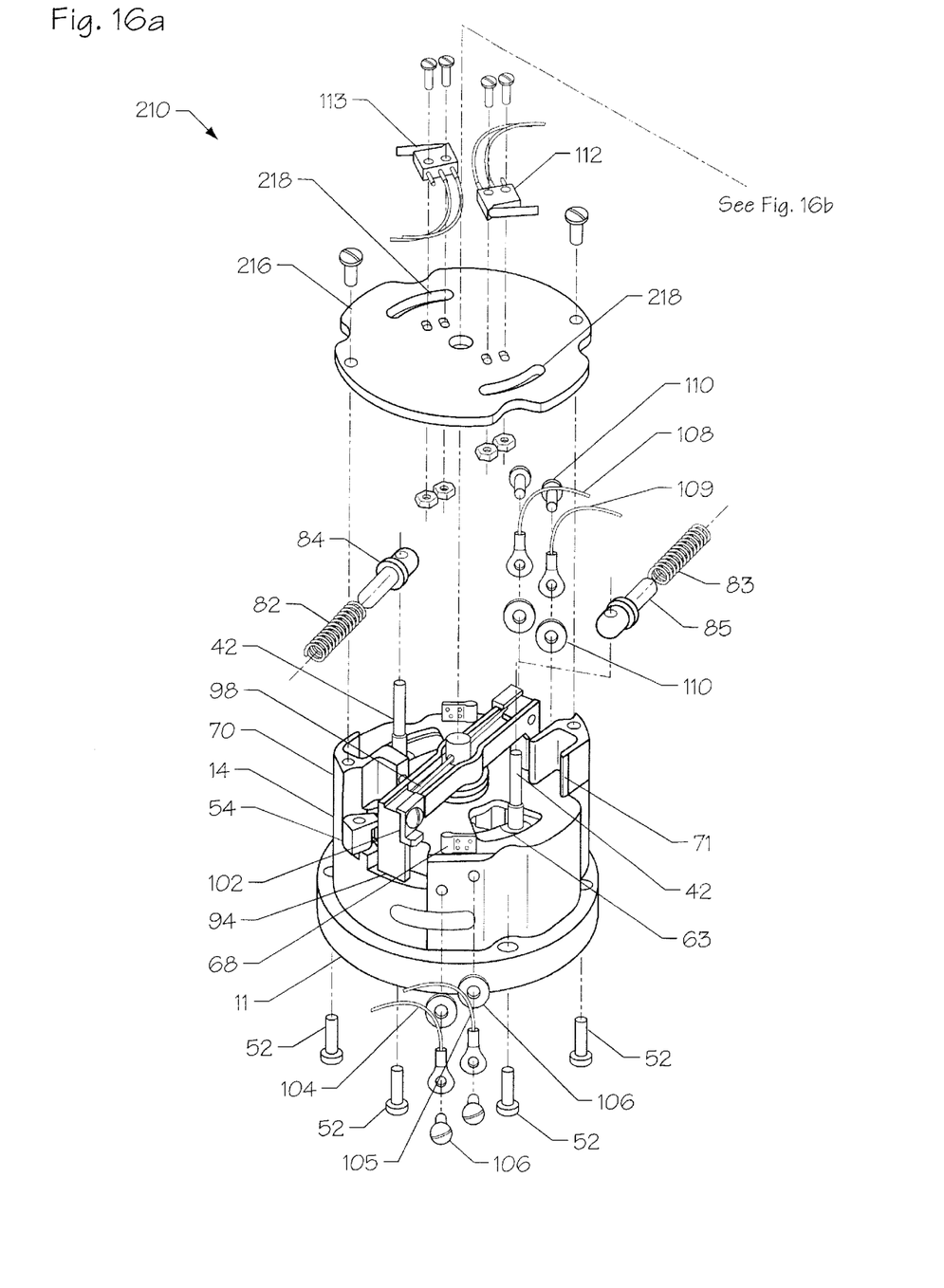
FIG. 16 is an exploded perspective view of an alternate separation mechanism, constructed in accordance with the present invention.
Figure 16B:
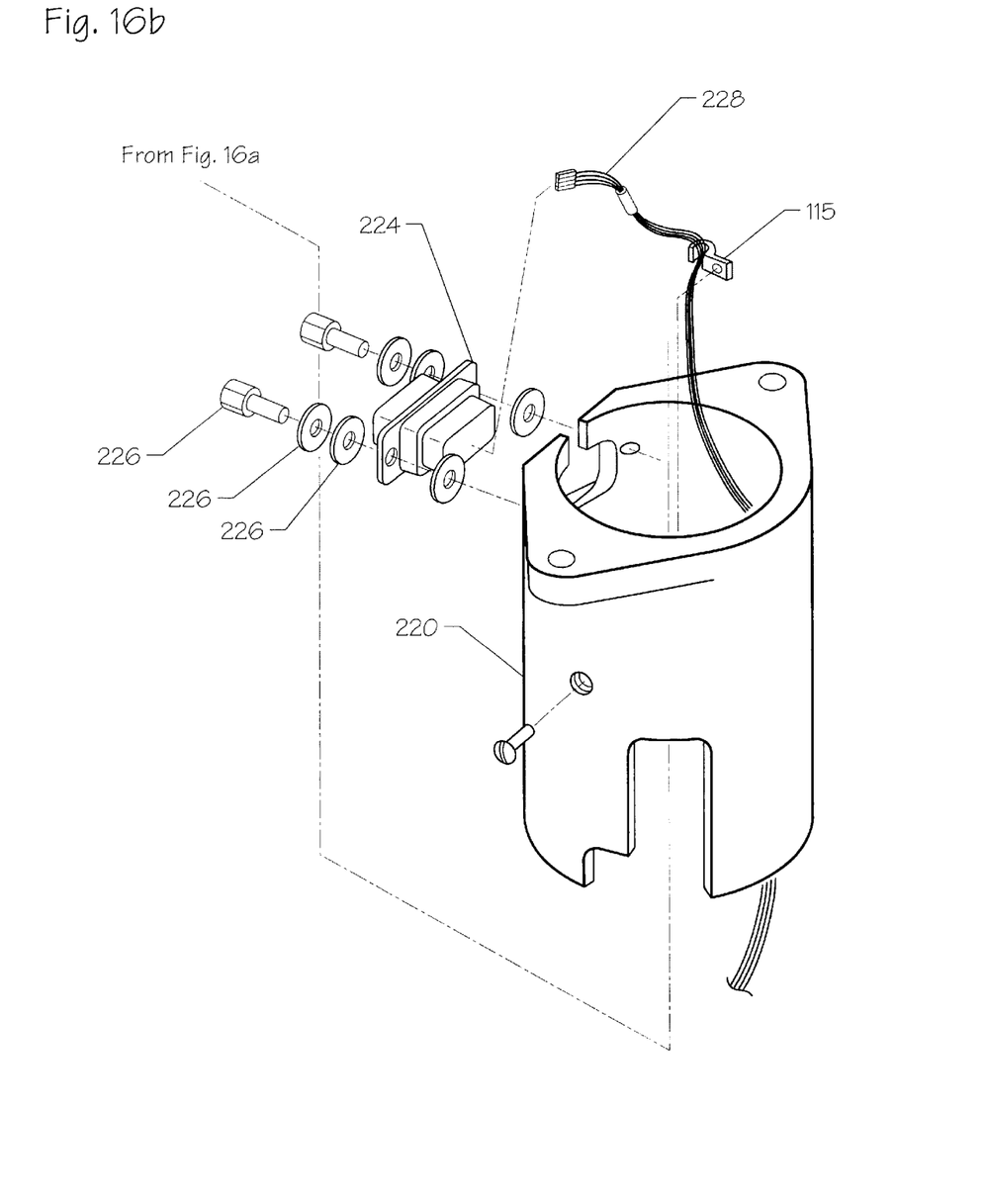

An alternative embodiment of a separation mechanism 210 is illustrated in FIG. 16. This embodiment comprises many of the components (shown with like element numbers) of the separation mechanism 10 but is useful when it is desirable to mount the separation mechanism 210 at the cover end with the retained object, e.g., cap screw 15, being retained and released outboard from the structure, i.e., spacecraft. To provide this alternative mounting, the separation mechanism 210 includes a planar cover 216 with grooves 218 similar to groove 18 that fastened to the housing 14. The housing 14 and fastened cover 216 are positioned entirely within protective shell 220 that provides for mounting on a structure (such as a spacecraft, not shown) and protects components of the separation mechanism 210 from contamination and physical damage. Electrical connector 224 (e.g., a standard 15 pin "D"-type electrical connector) can be fastened to the shell 220 with fasteners 226 to facilitate running of wire 228 into the shell 220 to provide electrical pulses to wires 104, 105, 108, and 109 and to complete position indicator circuits (not shown) including position indicators 112, 113.

A number of control circuits (not shown) or methods may be employed as part of the present invention to control the triggering or release of the separation mechanism 10. As discussed above, the repeated (for resetting) use of SMA actuator wires 116, 118 requires that heat be applied to the wire material to heat the wire material through the transition temperatures, e.g., 90° C. to 110° C., without reaching the annealing temperature range, e.g., 200° C. to 250° C., for the wire material. Heating is generally controlled by selectively transmitting relatively large pulses of electricity (AC or DC) through the actuator wires 116, 118 or by applying relatively small amounts of electricity (AC or DC) across the actuator wire 116, 118 for a longer period of time. Because the present invention may be triggered or actuated with either of these control methods, the separation mechanism 10 may be readily used as a drop-in replacement in release systems presently designed with a pyrotechnic release device that is triggered by a strong pulse of electricity and, also, in release systems that employ a typical heater circuit that provides a much smaller amount of current for a longer period of time.

When the separation mechanism 10 is placed in a typical pyrotechnical release system, the actuating assembly 8 is triggered by applying a firing impulse, typically 3.5 to 5.5 amps for about 20 to 50 milliseconds, to the actuator wires 116, 118 through wires 108, 109 and 104, 105, respectively. Because the space industry may prefer to not use electrical switches in flight circuits to minimize electrical failures, two separate circuits, a ground test circuit and a flight operations circuit, may be provided to transmit the firing impulse. The ground test circuit may then include an in-line switch in communication with position indicators 112, 113 to automatically interrupt power to the actuator wires 116, 118 when the flywheel 40 reaches the triggered or release position. Concurrently, a signal can be transmitted to an operation monitoring system or communication device to verify operation of the separation mechanism 10. The separation mechanism 10 may then readily be reset for reuse, i.e., flight operations. The flight operations circuit would function to transmit a firing pulse with the amount of power being limited by the duration of the firing pulse. Overheating is generally not a concern for flight operations because the separation mechanism 10 typically will be used only once during a space flight to release a retained object or payload.

When a heater circuit (not shown) typical of spacecraft is utilized to trigger the separation mechanism 10, the actuating assembly 80 is triggered by transmitting relatively small amount of current, e.g., 0.5 amps, for a relatively long period of time, e.g., 20 to 40 seconds. This current is applied to the actuating wires 116, 118 through the wires 108, 109 and 104, 105, respectively. In contrast with the pyrotechnic release system, a method of shutting off power or terminating the current supply needs to be provided in both the ground test circuit and the flight operations circuit. A number of such methods may e envisioned including, but not limited to, the use of shut off switches and logic controllers each adapted to shut off power at the end of a set time period selected to heat the actuator wire well past the phase change transition temperature to insure actuation or, more preferably, to shut off power upon receiving a signal form position indicators 112, 113 that the flywheel 40 had reached the released position.

The foregoing description is considered as illustrative only of the principles of the invention. Furthermore, since numerous modifications and changes will readily occur to the skilled in the art, it is not desired to limit the invention to the exact construction and process shown and described above. Accordingly, resort may be made to all suitable modifications and equivalents that fall within the scope of the invention as defined by the claims which follow. The words "comprise," "comprises," "comprising," "include," "including," and "includes" when used in this specification and in the following claims are intended to specify the presence of stated features, integers, components, or steps, but they do not preclude the presence or addition of one or more features, integers, components, steps, or groups thereof.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

We claim:

1. A self-aligning release assembly for a separation mechanism, the separation mechanism having a protective housing for selectively releasably securing a fastener, the protective housing mountable to a structure, the release assembly comprising:

a rotatable flywheel having an internal bearing race, the bearing race having a plurality of recessed portions;

a plurality of bearing elements contacting the bearing race;

a positioning element within and adjacent the flywheel for aligning and retaining the bearing elements; and retaining means for releasably retaining the fastener, the retaining means positioned within the flywheel with the outer surfaces of the retaining means abutting the bearing elements;

wherein in a locked position, the bearing elements forcibly urge the retaining means radially inward to retain the fastener and wherein upon rotation of the flywheel to a released position, the positioning element aligns the bearing elements with the recessed portions on the bearing race of the flywheel allowing the retaining means to move in a direction away from and release the fastener.

2. The release assembly of claim 1 wherein the retaining means is a segmented retaining device shaped and sized for receiving the fastener.

3. The release assembly of claim 1 wherein the retaining means include guides for guiding the movement of the retaining means relative to the fastener.

4. The release assembly of claim 1 and further comprising:

actuating means for causing the flywheel to move between a locked position and a released position.

5. The release assembly of claim 4 wherein the actuating means includes at least one latch notch formed in the flywheel, and further includes latch means movable within the latch notch between the locked position and the released position for selectively releasably maintaining the bearing elements in the locked position or the released position.

6. The release assembly of claim 5 wherein the flywheel includes a first notch and a second notch and the latch means includes a first pivotable toggle latch mechanism and a second pivotable toggle latch mechanism, the first notch receiving the first pivotable toggle latch mechanism and the second notch receiving the second pivotable toggle latch mechanism.

7. The release assembly of claim 5 and further comprising:

at least one pivot pin mounted to the flywheel for limiting the extent of rotation of the flywheel; and spring means connected to the pivot pin for urging the latch means into the latch notch.

8. The release assembly of claim 5 and further comprising:

a least one shape memory alloy wire connected to the latch means such that upon heating of the wire, the length of the wire is reduced causing the latch means to move within the latch notch and allow the flywheel to rotate from the locked position to the released position and such that upon cooling of the wire, the length of the wire is increased causing the latch means to move within the latch notch and allow the flywheel to rotate from the released position to the locked position.

9. The release assembly of claim 8 wherein the shape memory alloy wire is selected from the group consisting of TiNi, CuAlNi, and TiNiPd.

10. The release assembly of claim 1 wherein the bearing elements are roller bearings, each roller bearing having a substantially elongated shape.

* * * * *